Patented Sept. 20, 1932

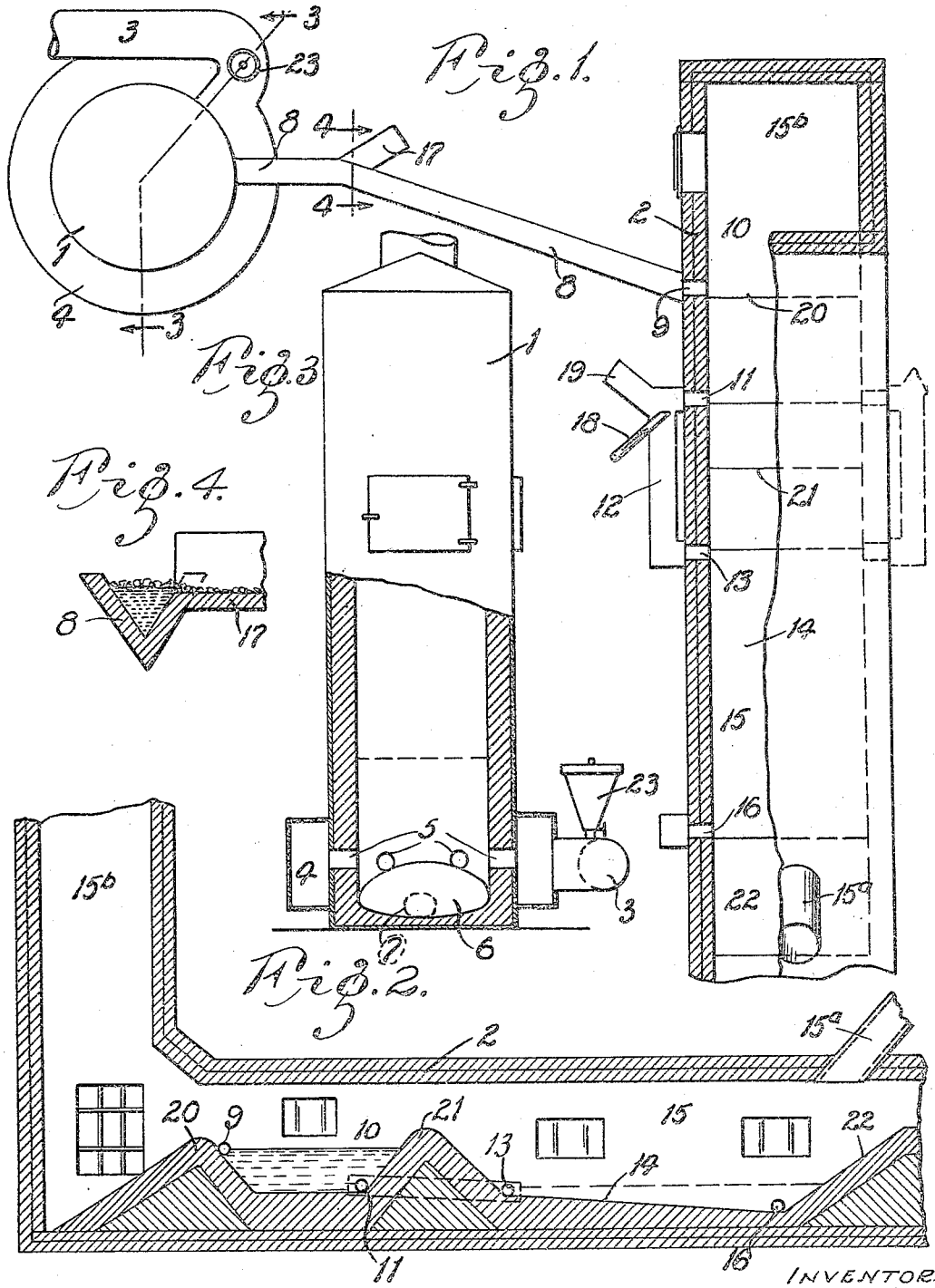

1,878,623

UNITED STATES PATENT OFFICE

VOTAW S. DURBIN, OF ST. LOUIS, MISSOURI

DUPLEX FURNACE FOR MELTING METALS

Application filed July 30, 1928. Serial No. 296,124.

This invention relates to certain new and useful improvements in furnaces for melting metal, and is especially designed for use in melting metal for producing malleable iron castings.

As now generally practiced, the metal for making malleable iron castings is melted in what are known as air furnaces, which are relatively low and long. In these furnaces, the mixture of metals, usually pig-iron, steel, and malleable scraps, is melted by a blast of combustible material, such as oil or pulverized coal mixed with air, and the time required for melting is very considerable as compared with the time that would be required for melting the same amount of material in a cupola furnace if the latter could be used for this purpose. A cupola furnace, however, while suitable for melting metal to be used in gray iron castings, cannot be used with malleable iron, because of the lack of uniformity of the melted product. That is to say, in using the cupola furnace, it is constantly being recharged from the top by adding alternate layers of coke and metal, and as it is impossible to always secure the exact proportions of coke and metal as was present when the furnace was originally charged, it is clear that the melted product will vary from time to time. This absolutely destroys its availability for use in connection with making malleable iron.

My invention aims to utilize the advantages inherent in both the cupola and air furnaces by producing a duplex furnace in which the melting is done in a cupola furnace and the melted produce discharged into an air furnace having a preliminary melting tank into which the molten metal from the cupola is first discharged, and a main heating tank in communication with the preliminary tank, which arrangement insures practically absolute uniformity in the constitution of the molten metal.

My invention is further characterized by the provision of improved means for adding a de-sulphurizing compound to the molten metal in the cupola furnace, and further, by the provision of improved means for removing slag from the surface of the molten metal both as it emerges from the cupola and as it passes from the preliminary tank of the air furnace to the main tank of said furnace.

Considered in its broad aspect, therefore, my invention resides in melting the materials for malleable iron in a cupola furnace, transferring the same to a preliminary tank of an air furnace, and conducting the same from said preliminary tank to a main tank, from which latter the batch of molten metal is poured into the castings.

The invention is illustrated in the accompanying drawing, in which—

Figure 1 is a view looking from above showing a cupola furnace and connected parts in plan, and an air furnace partly in plan and partly in section;

Figure 2 is a longitudinal sectional view of the air furnace;

Figure 3 is a view of a cupola furnace, the upper part being in elevation and the lower part being in vertical section, taken on the line 3—3 of Fig. 1; and Figure 4 is a section on an enlarged scale taken on line 4—4 of Fig. 1, illustrating the means for removing dross or slag from the surface of the molten metal passing from the cupola to the air furnace.

Referring now to the drawing, the numeral 1 indicates a cupola furnace, and the numeral 2, an air furnace. The cupola furnace is of the usual construction having an air blast pipe 3 communicating with a circular conduit 4 at its bottom, from which apertures 5 lead into the furnace for permitting the air blast to pass upward through the material therein. The floor of the furnace 6 is inclined, as shown by Fig. 3, at the bottom of which incline is located an outlet opening 7, the relative position of which is indicated by dotted lines in Fig. 4, which is located immediately above a V-shaped trough 8 which leads to the air furnace 2 and is connected thereto immediately under an aperture 9 in the wall thereof (Figs. 1 and 2), which aperture 9, as shown, is located at the upper part of the preliminary melting chamber 10. At its other end and at the bottom thereof, the preliminary melting chamber 10 is provided with an aperture 11 which communicates through the wall of the furnace with one end of a short trough 12, the other end of which is secured to the wall of the air furnace immediately under an opening 13 which is located at the upper end of an inclined bottom 14 of the main melting tank 15 of the air furnace. At the other end of said main melting tank and at the bottom thereof is provided the outlet opening 16 through which the metal is withdrawn for the castings. The ignitible mixture for the air furnace enters the main melting tank through a pipe 15a communicating with said tank through the top thereof, and the hot gases and products of combustion thence flow over the preliminary heating chamber, or tank, 10 and pass out through the chimney 15b at the other end of the air furnace.

The means for automatically removing slag or dross from the surface of the molten metal flowing through the trough 8 is best illustrated in Fig. 4, and comprises a short trough section 17 the bottom portion of which is fitted to a V-shaped opening made in the wall of the trough 8. This opening is positioned relative to the normal height of the molten metal flowing through the trough 8 and the slag or dross will flow out of said opening into the trough 17 and be led to a suitable place of discharge.

The means for removing the dross or slag from the surface of the molten metal passing from the preliminary tank 10 through trough 12 to the main tank 15 consists in arranging a steam pipe 18 to one side of the opening 11 leading from the preliminary melting tank into the trough 12 and in leading off from the end of the trough 12 at this point a short trough section 19. In operation, the blast of steam passing through pipe 18 is directed against the surface of the molten metal and forces the slag or dross backward so that the same will flow off through the trough section 19, leaving the molten metal free to flow through the trough 12 into the main melting or heating tank.

By referring to Fig. 2, it will be seen that the preliminary tank 10 in the air furnace is produced by making two inverted V-shaped elevations 20 and 21 in the bottom of the said furnace, and that the elevation 21 forms one end of the main melting tank 15, the other end of which is provided by an inclined elevation 22. In Figs. 1 and 2, I have shown a small container indicated by the numeral 23, which is mounted on the air blast pipe 3 and is supplied with a suitable de-sulphurizing compound in powdered form. When the air blast is turned on to the cupola, this powdered substance will be drawn out of the container and into the cupola, where is combines with the material therein in the well known manner to free the molten metal from sulphur.

In operation, the cupola furnace is supplied with alternate layers of metal and coke which, in practice, beginning at the bottom of the furnace, would run in substantially the following order: coke, pig-iron, coke, scrap malleable and steel, coke, steel, etc. The fire being initiated and the blast turned on through pipe 3, the metal gradually melts and flows to the bottom of the furnace, and when it has reached a certain height, the aperture 7 which has been tamped, is opened and the molten metal allowed to flow through the trough 8 into the preliminary melting tank 10 of the air furnace. This operation may be repeated several times before any metal is removed from the tank 10, the purpose of this being to always maintain a body of molten metal in the tank 10 so that as each fresh batch flows into the tank, it will mix with the preceding batch so that the metal drawn from the tank 10 into tank 15 will be uniform in its quality or constitution. From time to time, the opening 11 will be untamped and a given amount of the molten metal permitted to flow from tank 10 through trough 12 into tank 15, whence it is withdrawn as needed for the molding flasks. At all times, as will be understood, there is substantially a sheet of flame passing through the air furnace as a result of the blast of oil or pulverized coal from the pipe 15a so that the metal is maintained in a highly fluid condition in both the tank 10 and the tank 15.

I have referred herein to the tanks 10 and 15 both as heating and melting tanks, for the reason that although the metal is in a molten condition when it flows into tank 10 and equally so when it flows into tank 15 from tank 10, nevertheless some cooling of the molten metal will follow from the flow of the metal from the cupola to the air furnace, and the intense heat in this latter furnace will result in reducing the metal to a more liquid state than it possessed when it entered the furnace and, of course, will also mantain the metal in such high degree of fluidity.

My improved duplex melting furnace results in the saving of a vast amount of time in the operation of a foundry making malleable castings. As an illustration, and based on actual tests, a twenty-ton heat in the air furnace required from eight to eleven hours before the metal was reduced to a molten condition. In the use of the duplex furnace herein described, a twenty-ton heat was run in approximately one hour and thirty minutes. This is, of course, due to the fact that, as is well known, the cupola furnace has very high efficiency as compared with the air furnace in melting metal, but, heretofore, as previously referred to, its use has not been possible in making malleable iron, for the reason that owing to the lack of uniformity in the various charges placed in the furnace, the molten metal will vary in its constitution from time to time, and hence the castings will not be uniform. With my invention, this objection is overcome, for the reason that by maintaining in the preliminary tank of the air furnace a quantity of molten metal, the fresh metal run into the tank will be so thoroughly diffused with the metal previously in the tank that its quality or character will be maintained substantially uniform.

As shown by dotted lines at the right of the air furnace of Fig. 1, I can, if desired, duplicate the arrangement for conveying the molten metal from the preliminary heating tank to the main heating tank, and as the construction would be an exact duplicate of that already described, no detailed description of this added arrangement is deemed necessary.

I claim:

1. An air furnace having a preliminary heating tank and a main heating tank housed therein in line with each other, means for causing a blast to enter the air furnace at the end thereof containing the main tank and to pass out at the end containing the preliminary tank, a conduit for conveying molten metal to the preliminary heating tank, a conduit located on the outside of the air furnace and affording communication between the preliminary heating tank and the main heating tank, the main heating tank having an outlet for drawing off the molten metal to be run into the molds.

2. An air furnace having a preliminary heating tank and a main heating tank housed therein in line with each other, means for causing a blast to enter the air furnace at the end thereof containing the main tank and to pass out at the end containing the preliminary tank, means for conveying molten metal to said preliminary heating tank, a conduit for conveying molten metal from said preliminary heating tank to said main heating tank, said conduit having a discharge section, and a steam pipe located adjacent the outlet from said preliminary heating tank to said conduit and positioned to direct a blast of steam against the surface of the molten metal flowing out of said preliminary tank and causing it to flow out of the discharge section of said conduit.

3. An air furnace having a preliminary heating tank and a main heating tank housed therein in line with each other, means for causing a blast to enter the air furnace at the end thereof containing the main tank and to pass out at the end containing the preliminary tank, a conduit for conveying molten metal to the preliminary heating tank, an open conduit located on the outside of the air furnace and affording communication between the preliminary heating tank and the main heating tank, the main heating tank having an outlet for drawing off the molten metal to be run into the molds.

In testimony whereof, I have hereunto set my hand.

VOTAW S. DURBIN.